(No Model.)
W. S. HUNTINGTON.
LATHE FOR TURNING IRREGULAR FORMS.
No. 254,480. Patented Mar. 7, 1882.
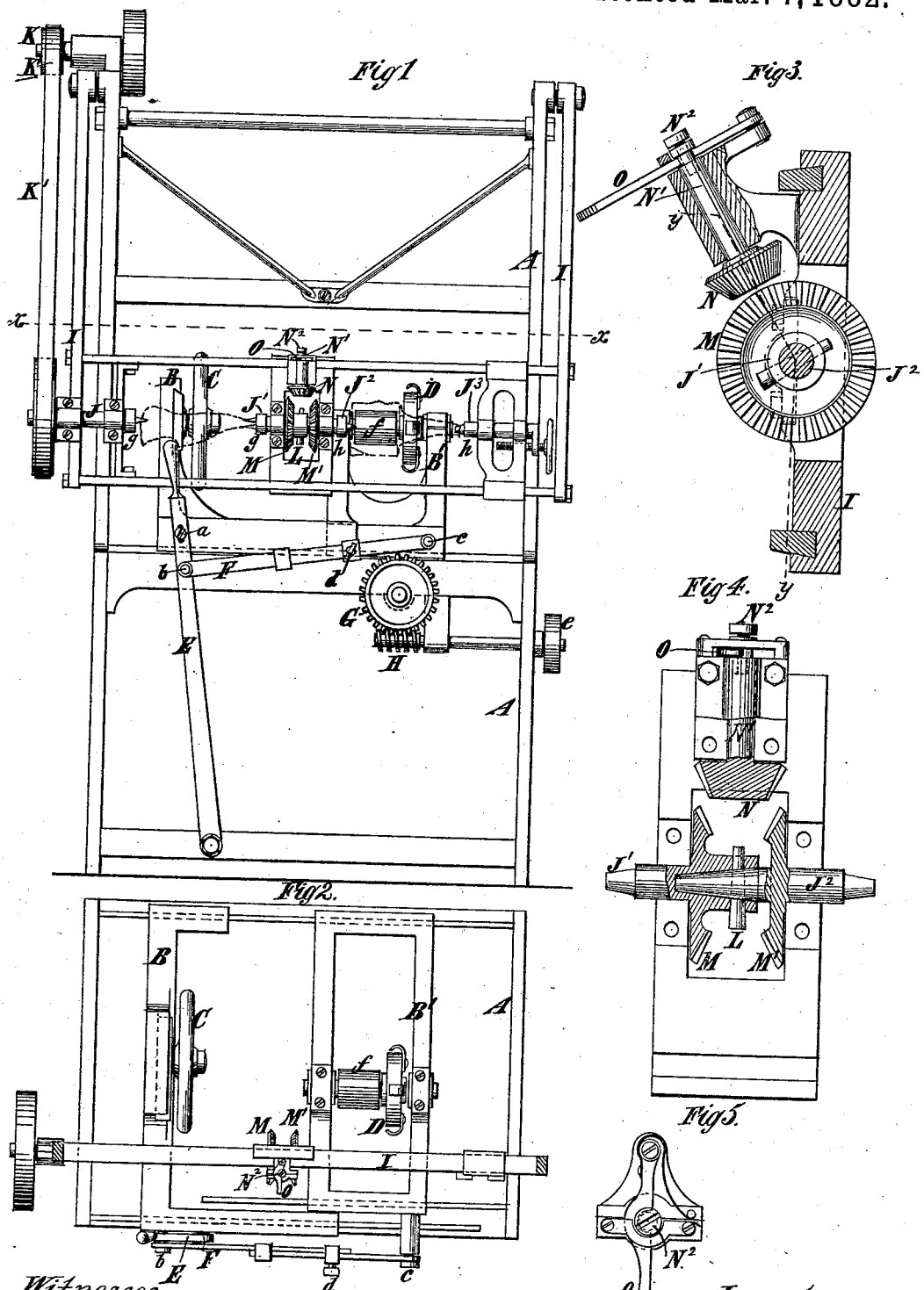
Witnesses:
J. H. Keane
Ed Moran
Inventor:
W. S. Huntington
By his atty
Edwin H. Brown

UNITED STATES PATENT OFFICE.

WILLIAM S. HUNTINGTON, OF BROOKLYN, NEW YORK.

LATHE FOR TURNING IRREGULAR FORMS.

SPECIFICATION forming part of Letters Patent No. 254,480, dated March 7, 1882.

Application filed November 18, 1881. (No model.)

*To all whom it may concern:*

Be it known that I, WILLIAM S. HUNTINGTON, of Brooklyn, in the county of Kings and State of New York, have invented certain new and useful Improvements in Lathes for Turning Irregular Forms, of which the following is a specification.

These improvements relate particularly to lathes for turning boot and shoe lasts.

The object of my improvements is to afford greater facility for cutting a last the reverse of the pattern employed than exists in ordinary lathes employed for turning lasts.

To this end the improvements consist in the combination, in a lathe, of a shaft or spindle comprising two sections for carrying a pattern and two other sections in line therewith for carrying the work, means for locking the sections carrying the pattern and those carrying the work together, so that all will rotate together, and gear-wheels which may be engaged, when the said sections are unlocked from each other, to cause the sections carrying the pattern to rotate reversely to the sections carrying the work, as particularly hereinafter described and claimed, whereby a last corresponding to the pattern or the reverse of the pattern may be produced at pleasure in the lathe.

In the accompanying drawings, Figure 1 is a front view of a lathe embodying my improvements. Fig. 2 is a sectional plan of the same, taken on the plane of the dotted line $x$ $x$, Fig. 1. Fig. 3 is a vertical section on a larger scale illustrative of the mechanism whereby the sections of the pattern and work spindle or shaft may be locked and driven together or unlocked and driven reversely. Fig. 4 is a sectional front view of this mechanism, taken at the planes of the dotted line $y$ $y$, Fig. 3. Fig. 5 is a plan or top view of the upper part thereof.

Similar letters of reference designate corresponding parts in all the figures.

A designates the main frame of the lathe, consisting essentially of side pieces and connecting cross-pieces or stretchers, and comprising ways or shears, on which is mounted a carriage, B B', so that it may travel to and fro. This carriage is composed of two parts, B and B', the former of which carries a pattern-wheel or governor, C, and the other of which carries a rotary cutter, D. The two parts of the carriage are connected to travel in unison by means of a lever, E, and link F. This lever is fulcrumed to the base of the lathe, and is directly connected to the part B of the carriage by a pin, $a$. The link F is pivoted at one end to the lever by a pin, $b$, and at the other end is connected to the part B' of the carriage by a pin, $c$. The link is made in sections, which may be adjusted into different relations to elongate or shorten it, and can be secured together by means of a set-screw, $d$. When so secured the connection between the parts of the carriage is completed. The adjustment thus afforded between the pattern-wheel or governor and the cutter enables them to be adapted to operate with different-sized patterns and to produce different-sized lasts. Motion is transmitted to the carriage by a gear-wheel engaging with a rack on its under side. On the same shaft as this gear-wheel there is a worm-wheel, G, to which motion is imparted by a worm or screw, H. The latter is driven by a belt on a pulley, $e$. The carriage has a very slow motion to cause the pattern-wheel or governor to move past the pattern and the cutter to move past the material to be turned. The cutter D is rotated by a belt on a pulley, $f$, which is mounted on the same shaft.

I designates a frame, which is suspended at or near the upper end from the main frame, and can be swung forward and backward. Near the lower end it carries a rotary shaft or spindle which is composed of four sections, J, J', $J^2$, and $J^3$. The section J is provided with a pulley, to which motion is transmitted by a belt, K', from a shaft, K. This section, in conjunction with the section J', holds the pattern by means of suitable clutches, $g$, with which they are provided. The sections $J^2$ and $J^3$ are provided with clutches $h$, whereby they hold the material to be turned. The section $J^2$ fits into the adjacent end of the section J', and is coned or tapered to give it a long bearing therein. A pin or key, L, may be driven into transverse holes provided in these sections to lock them together. When this pin or key is removed the sections J and J', with the pattern between them, may be driven together, and the sections $J^2$ and $J^3$, with the material to be turned, may be rotated together. On the section J' is a bevel-gear wheel, M, and on the section J² is a corresponding bevel-gear wheel, M'.

N designates a bevel-pinion, which is mounted on a shaft, N', which can be moved up and down in its bearings, so as to adjust the pinion into or out of engagement with the bevel-wheels M M'. A lever, O, fulcrumed to the frame I, may be passed over the head or upper end of the pinion-shaft N', to hold the pinion down in close engagement with the bevel-wheels, or it may be made to interlock with a peripherical groove in the shaft, to hold the shaft up when the pinion is disengaged from the bevel-wheels.

N² designates a screw fitted to the upper end of the pinion-shaft. It may be adjusted outward or inward for the purpose of varying the length of the shaft, so that when the pinion is engaged with the bevel-wheels the lever O may hold it in proper engagement therewith.

The pattern and the material which is to form the last are arranged in corresponding positions; or, in other words, the end of the material which is to form the toe of the last is the farther from the toe of the pattern. When a last is to be formed to correspond with the pattern—for instance, a right last from a right pattern—the sections J' and J² of the shaft or spindle are locked together, and all sections of the shaft or spindle move in unison, carrying with them the pattern and the material to be turned. When, however, a last is to be produced the reverse of the pattern—for instance, a left last from a right pattern—the sections J' J² of the shaft or spindle are unlocked, and the pinion N is engaged with the bevel-wheels M M'. Then the pinion transmits to the sections J² J³ and the material to be turned a rotation in the opposite direction to that in which the sections J J' and the pattern are rotated. The belt K' is removed and a crossed belt is used in its place for the latter kind of work.

It will be seen, therefore, that I adapt the lathe to be very readily and expeditiously changed to suit it for producing from a single pattern a last of the same or reverse kind. I also simplify the lathe, because I use very simple means for making the changes, and I save the time of the artisans employed, in that I enable the changes to be made more expeditiously than has heretofore been possible. My improvements may be found useful in lathes for other purposes.

I do not confine myself to the use of bevel-wheels, as I can employ a longitudinally-adjustable shaft carrying two gear-wheels, one adapted to engage with the exterior of the rim of a gear-wheel on one section of the shaft or spindle carrying the pattern and material to be turned, and the other adapted to engage with the interior of the rim of a gear-wheel on the other section of said shaft or spindle.

What I claim as my invention, and desire to secure by Letters Patent, is—

1. The combination, in a lathe, of a shaft or spindle comprising sections J J', for carrying a pattern, and sections J² J³ in line therewith, for carrying the work, means for locking the sections J' J² together, so that all the sections will rotate together, and gear-wheels which may be engaged when the sections J' J² are unlocked from each other, to cause the sections J J' to rotate reversely to the sections J² J³, all substantially as and for the purpose herein described.

2. The combination, in a lathe, of a shaft or spindle for supporting a pattern and the material to be turned, comprising sections J' and J², the pin L, the bevel-gear wheels M M', the pinion N, and its adjustable shaft N', substantially as and for the purpose specified.

3. The combination, in a lathe, of a shaft or spindle for supporting a pattern and the material to be turned, comprising sections J' J², the pin L, the bevel-gear wheels M M', the pinion N, the shaft N', screw N², and lever O, substantially as and for the purpose specified.

W. S. HUNTINGTON.

Witnesses:
T. J. KEANE,
JAMES R. BOWEN.